No. 898,402. PATENTED SEPT. 8, 1908.
W. BRAMELD.
ELASTIC VEHICLE TIRE.
APPLICATION FILED AUG. 14, 1907.
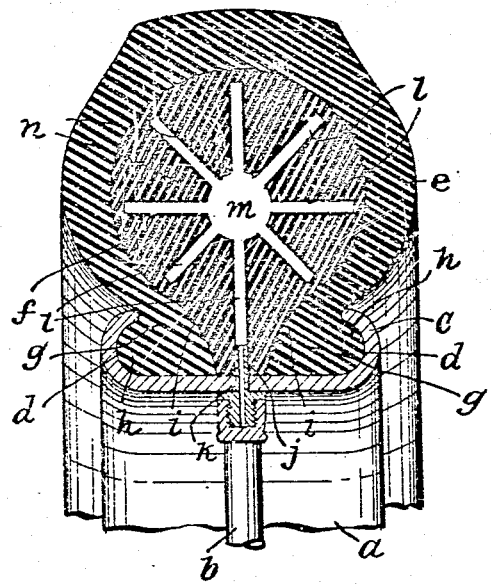
WITNESSES
Wm. D. Bell.
Adolph Molt
INVENTOR,
William Brameld,
BY
ATTORNEYS.

UNITED STATES PATENT OFFICE.

WILLIAM BRAMELD, OF PATERSON, NEW JERSEY, ASSIGNOR OF ONE-TENTH TO JAMES T. JORDAN, OF PATERSON, NEW JERSEY.

ELASTIC VEHICLE-TIRE.

No. 898,402.     Specification of Letters Patent.     Patented Sept. 8, 1908.

Application filed August 14, 1907. Serial No. 388,449.

*To all whom it may concern:*

Be it known that I, WILLIAM BRAMELD, a citizen of the United States, residing in Paterson, Passaic county, New Jersey, have invented a certain new and useful Improvement in Elastic Vehicle-Tires; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention is an improvement in vehicle wheels having elastic tires which have their base portions laterally expansible in character and thereby adapted to interlock with the grooved rim of the wheel, and it has for its object to so construct the tire as to render the interlocking action of the tire and rim more effectual and secure.

A further object of my invention is to so construct an elastic tire of the pneumatic type that it will be adapted to effectually sustain the load borne thereby even though the air should escape and cease to practically maintain the tire in inflated condition; with respect to this object, my invention is applicable in certain aspects thereof to pneumatic tires whether of the single or pluri-tube variety.

The accompanying drawing shows my invention as applied to a tire of the clencher pneumatic type, the view being a cross-section through the tire.

$a$ in the drawing is the rim and $b$ one of the spokes. The rim is of that form which is characterized by having its edge portions $c$ turned inwardly toward each other to form the opposed grooves $d$.

In the adaptation shown, the tire comprises the outer member or casing $e$ and the inner member or core $f$. Both members are preferably formed of elastic material, such as is commonly used in the manufacture of elastic rubber vehicle tires.

The member $e$ may be formed in substantially the same shape as the outer member or casing of the ordinary clencher pneumatic tire, it having in its base portions $g$ the lateral flanges $h$ which engage in the grooves of the rim $a$ and, under internal pressure, thus interlock the tire with the rim. I prefer, however, to form the base portions $g$ of the member $e$ with a slight convexity $i$ on the inside thereof, for a purpose hereinafter indicated.

The member or core $f$ is so constructed that it substantially snugly fits the inside of the member or casing $e$ at all points when the parts are adjusted to the rim. Thus, the inner or core member $f$ will have its base portion $j$ substantially in the form of a wedge, viewing said member cross-sectionally, the sides of the wedge being slightly concave to accommodate the convexities $i$ of the base portions $g$ of member $e$. Furthermore, the base portion $j$ of member $f$ extends between the separated parts forming the base portion of member $e$ and bears squarely against the rim $a$, as at $k$.

As so far described, and without any regard to whether or not member $f$ is formed hollow in the manner hereinafter stated, or otherwise, my invention results in the following advantage: Pressure exerted toward the rim $a$ on the base portion of member $f$ will cause the same to act as a wedge between the parts $g$ forming the base of member $e$, so that they will be forced apart and tend more effectually to interlock with the rim.

I prefer to provide the convexities $i$ in member $e$ and corresponding concavities in member $f$ above referred to partly because thereby the base portion of member $e$ will be reinforced, and partly to make allowance for the tendency of the sides of the base-portion $j$ of member $f$ to bulge laterally under the compression of said member. The effectiveness of the base portion $j$ of member $f$ as a wedge is thus maintained although compression may to some extent alter its shape.

Where the tire is of the pneumatic type, I provide it with cells $l$ which are preferably narrow and radiate from a common central bore or chamber $m$. The hollow formation of the tire thus produced extends continuously thereof so that when the tire is inflated air will occupy the chamber $n$ and all of the cells $l$. By forming the cells $l$ narrow, sector-shaped, closely disposed, internal ribs $n$ are formed in the core $f$ so that, should the tire be punctured and the air escape, said sector-shaped ribs $n$ will coöperate with each other to retain the tire in such shape as to adequately bear the load and prevent such a collapse of the tire as to make it inexpedient to further use it until reinflated.

It will be observed that one of the cells $l$ extends down into the wedge shaped base portion or member $f$; thus, when the tire is inflated, the air pressure being admitted into the base portion of the tire, it acts to expand the same and increase the interlocking action between the tire and rim, and yet, being limited in width, it will not allow so much play from the face of one rib $n$ to the other as to permit the tire to become unlocked from the rim under a sidewise pressure, as in turning.

Having thus fully described my invention, what I claim as new and desire to secure by Letters Patent is:

1. An elastic unitary tire member having cells arranged in lines radiating, in the cross-section of the member, from substantially a common center, each cell extending short of the exterior surface of said member but having its radial dimension equal to the major portion of the corresponding dimension of said member, substantially as described.

2. An elastic unitary tire member having relatively narrow cells arranged in lines radiating, in the cross-section of the member, from substantially a common center, each cell extending short of the exterior surface or said member but having its radial dimension equal to the major portion of the corresponding dimension of said member, substantially as described.

3. In a vehicle tire, the combination of a rim having opposed grooves and a tire having an expanding base portion formed with lateral flanges interlocked with the grooves of the rim, said tire having cells radiating, in the cross-section of the tire, from a substantially common center, each cell extending short of the exterior surface of the tire but having its radial dimension equal to the major portion of the corresponding dimension of said tire, and one of said cells extending into said base portion, substantially as described.

In testimony, that I claim the foregoing, I have hereunto set my hand this 10th day of August, 1907.

WILLIAM BRAMELD.

Witnesses:
JOHN W. STEWARD,
JAS. T. JORDAN.